(12) United States Patent
Elsässer et al.

(10) Patent No.: US 8,857,177 B2
(45) Date of Patent: Oct. 14, 2014

(54) PISTON ENGINE

(75) Inventors: Alfred Elsässer, Keltern (DE);
Hermann Hoffmann, Stuttgart (DE);
Sascha Senjic, Ostfildern (DE); Peter Wieske, Korntal-Münchingen (DE)

(73) Assignee: Mahle International GmbH (DE)

( * ) Notice: Subject to any disclaimer, the term of this patent is extended or adjusted under 35 U.S.C. 154(b) by 1259 days.

(21) Appl. No.: 12/676,445

(22) PCT Filed: Sep. 3, 2008

(86) PCT No.: PCT/EP2008/061587
§ 371 (c)(1),
(2), (4) Date: May 28, 2010

(87) PCT Pub. No.: WO2009/030694
PCT Pub. Date: Mar. 12, 2009

(65) Prior Publication Data
US 2010/0242472 A1    Sep. 30, 2010

(30) Foreign Application Priority Data

Sep. 5, 2007  (DE) .......................... 10 2007 042 053

(51) Int. Cl.
| | |
|---|---|
| F02B 33/44 | (2006.01) |
| F01L 1/26 | (2006.01) |
| F01L 1/34 | (2006.01) |
| F01L 1/344 | (2006.01) |
| F02D 13/02 | (2006.01) |
| F01L 1/047 | (2006.01) |
| F02D 37/02 | (2006.01) |
| F02B 29/08 | (2006.01) |
| F02B 37/20 | (2006.01) |
| F02D 41/00 | (2006.01) |
| F02D 41/10 | (2006.01) |

(52) U.S. Cl.
CPC .............. *F01L 1/267* (2013.01); *F02D 13/0257* (2013.01); *F02D 41/10* (2013.01); *F01L 1/047* (2013.01); *F02D 13/0249* (2013.01); *Y02T 10/144* (2013.01); *F02D 37/02* (2013.01); *F02B 29/083* (2013.01); *F02B 37/20* (2013.01); *F01L 2001/0473* (2013.01); *Y02T 10/146* (2013.01); *F02D 41/0007* (2013.01); *F01L 1/34413* (2013.01); *Y02T 10/18* (2013.01)
USPC ...... 60/602; 123/90.17; 123/90.31; 123/90.4; 123/90.6

(58) Field of Classification Search
CPC ........ F02B 37/20; F02B 37/02; F02B 29/073; F01L 1/047; F01L 1/267; F01L 1/34413; F01L 2001/0473; F02D 13/0249; F02D 41/0007; F02D 13/0257; F02D 41/10; Y02T 10/144; Y02T 10/18
USPC ............. 60/602; 123/90.17, 90.31, 90.4, 90.6
IPC .............. F01L 1/26, 1/344, 1/047; F02D 23/00, F02D 13/02; F02B 41/10
See application file for complete search history.

(56) References Cited

U.S. PATENT DOCUMENTS

| | | | | |
|---|---|---|---|---|
| 5,165,303 | A | * | 11/1992 | Riemscheid et al. ........ 123/90.6 |
| 5,230,320 | A | * | 7/1993 | Hitomi et al. .............. 123/90.15 |

(Continued)

FOREIGN PATENT DOCUMENTS

| | | | |
|---|---|---|---|
| DE | 3624827 A1 * | 2/1988 | ................ F01L 1/34 |
| DE | 3943426 C1 * | 12/1989 | ................ F01L 1/34 |

(Continued)

OTHER PUBLICATIONS

European search report for EP-08803558.9, dated on May 11, 2010.

(Continued)

*Primary Examiner* — Thai Ba Trieu
(74) *Attorney, Agent, or Firm* — Rader, Fishman & Grauer PLLC

(57) ABSTRACT

A piston engine, having at least one cylinder that includes at least a first and a second discharge valve and a double overhead camshaft for controlling the first and a second discharge valves. The double overhead camshaft includes both an inner shaft, which has at least one first cam for controlling the first discharge valve, and an outer shaft that is coaxial to the first inner shaft and has at least one second cam for controlling the second discharge valve. The inner shaft and the outer shaft are rotationally adjustable relative to one another changing the discharge time frame of the discharge valves.

22 Claims, 6 Drawing Sheets

(56) References Cited

U.S. PATENT DOCUMENTS

| | | | |
|---|---|---|---|
| 5,417,068 A * | 5/1995 | Olofsson | 60/602 |
| 5,417,186 A | 5/1995 | Elrod et al. | |
| 5,671,706 A * | 9/1997 | Frost et al. | 123/90.17 |
| 6,595,183 B1 * | 7/2003 | Olofsson | 123/90.15 |
| 6,725,817 B2 * | 4/2004 | Methley et al. | 123/90.17 |
| 7,308,872 B2 * | 12/2007 | Sellnau et al. | 123/90.16 |
| 7,909,025 B2 * | 3/2011 | Pagot | 123/559.1 |
| 7,997,237 B2 * | 8/2011 | Surnilla | 123/90.15 |
| 8,011,185 B2 * | 9/2011 | Inoue et al. | 123/90.15 |
| 8,065,878 B2 * | 11/2011 | Vuk | 123/90.15 |
| 8,113,160 B2 * | 2/2012 | Methley | 123/90.17 |
| 8,186,319 B2 * | 5/2012 | Pluta et al. | 123/90.15 |
| 8,495,865 B2 * | 7/2013 | Okada | 123/90.15 |
| 2005/0235939 A1 * | 10/2005 | Wilke | 123/90.17 |
| 2008/0066715 A1 * | 3/2008 | Jankovic | 123/90.16 |
| 2008/0215228 A1 * | 9/2008 | Krebber-Hortmann | 123/90.15 |
| 2010/0116255 A1 * | 5/2010 | Hatamura | 123/90.15 |
| 2010/0170458 A1 * | 7/2010 | Pluta et al. | 123/90.1 |
| 2010/0212315 A1 * | 8/2010 | Irisawa | 60/602 |
| 2010/0212616 A1 * | 8/2010 | Methley | 123/90.17 |
| 2010/0236517 A1 * | 9/2010 | Hatamura et al. | 123/90.15 |
| 2011/0000470 A1 * | 1/2011 | Roth | 123/90.15 |
| 2011/0073069 A1 * | 3/2011 | Marriott et al. | 123/90.15 |
| 2011/0219767 A1 * | 9/2011 | Miyashita | 60/600 |
| 2012/0145101 A1 * | 6/2012 | Yoshika et al. | 123/90.15 |

FOREIGN PATENT DOCUMENTS

| | | | | |
|---|---|---|---|---|
| DE | 3821935 A1 * | 2/1990 | | F02B 37/12 |
| DE | 3934848 A1 * | 4/1991 | | F01L 1/34 |
| DE | 102006014965 A1 | 10/2007 | | |
| EP | 1195505 A1 | 4/2002 | | |
| EP | 1870583 A1 | 12/2007 | | |
| FR | 2744170 A1 | 8/1997 | | |
| GB | 2185286 A | 7/1987 | | |
| GB | 2 369 175 A | 5/2002 | | |
| GB | 2431977 A * | 5/2007 | | F01L 1/344 |
| JP | 5-263671 A | 10/1993 | | |
| JP | 06323158 A | 11/1994 | | |
| WO | WO-0120136 A1 | 3/2001 | | |
| WO | WO-2007003360 A1 | 1/2007 | | |
| WO | WO 2009022210 A2 * | 2/2009 | | F02D 13/02 |

OTHER PUBLICATIONS

English abstract for JP-5-263671-A, published on Dec. 10, 1993.

International Search Report PCT/EP2008/061587, Dated Apr. 3, 2009.

English abstract provided for DE102006014965, published on Oct. 11, 2007.

English abstract provided for EP1870583, published on Dec. 26, 2007.

English abstract provided for EP1195505, published on Apr. 10, 2002.

English abstract provided for FR2744170, published on Aug. 1, 1997.

English abstract provided for JP6323158, published on Nov. 22, 1994.

* cited by examiner

PISTON ENGINE

CROSS-REFERENCES TO RELATED APPLICATIONS

This application is a National Stage application which claims the benefit of International Application No. PCT/EP2008/061587 filed Sep. 3, 2008, which claims priority based on German Application No. 10 2007 042 053.8, filed Sep. 5, 2007, both of which are hereby incorporated by reference in their entirety.

TECHNICAL FIELD

The present invention relates to a piston engine, particularly for a motor vehicle.

BACKGROUND

Piston engines have a plurality of cylinders respectively in which a piston is mounted in a stroke adjustable manner. Each cylinder has at least one inlet valve and at least one discharge valve for charge-changing processes. Modern engines may have a plurality of inlet valves or a plurality of discharge valves.

In order to increase performance, a piston engine can be equipped with an exhaust gas turbocharger with which the pressure in the fresh gas can be increased. In such charged engines, the problem frequently arises, particularly with low rotational speeds, that upon a load step change from partial load to full load, the turbocharger responds in a delayed fashion only owing to the mass inertia of the rotor assembly, which in turn leads to the so-called "turbocharger lag".

The present invention addresses the problem of providing for a piston engine of the previously mentioned type an improved embodiment that is particularly characterised by a relatively rapid response of an optionally present exhaust gas turbocharger being able to be achieved therewith.

This problem is solved according to the invention by the subject matter of the independent claim. Advantageous embodiments are the subject matter of the dependent claims.

The invention is based on the general concept of opening the exhaust-gas side discharge of at least one of the cylinders earlier than customary, that is to say at a point in time at which the exhaust gas in the cylinder still exhibits a greater pressure as well as a higher temperature compared to that of an opening occurring at a later point in time. Alternatively, the invention is based on the general concept of opening the exhaust-gas side discharge of at least one of the cylinders later than customary, that is to say at a point in time at which the exhaust gas in the cylinder already exhibits anew an increased pressure as well as an increased temperature in contrast to that of an opening occurring at an earlier point in time. By means of the respective measures, the pressure and the temperature in the exhaust gas and thus the enthalpy in the exhaust gas can be temporarily increased after the respective cylinder. In so far as a turbine of an exhaust gas turbocharger is arranged in the exhaust gas line, increased energy for accelerating the rotor assembly is thus available therefor compared to conventional engine timing. The exhaust gas turbocharger can thereby accelerate more rapidly and generate the desired increase in pressure on the fresh-gas side.

This is achieved with the piston engine according to the invention by means of a double overhead camshaft by means of which the discharge valves of the cylinders are controlled. The double overhead camshaft has an inner shaft and an outer shaft coaxial thereto that is configured as a hollow shaft, the two shafts being rotatably adjustable relative to one another. The shafts respectively support cams arranged thereon in a rotationally-fixed manner for controlling the discharge valves. At least one of the cylinders has two discharge valves of which the one can be controlled by means of one cam of the inner shaft, while the other can be controlled by means of one cam of the outer shaft. By changing the relative position, that is to say the relative rotational position between both of the shafts, the discharge time frame can be varied. In particular, the opening time and the closing time can be shifted independently of one another to early and/or late. In order to increase the enthalpy content of the expelled exhaust gas, it is thus possible in particular to shift the opening time of the discharge time frame to be earlier or later, in that the relative position between the shafts is correspondingly varied. The closing time of the discharge time frame can remain constant.

SUMMARY

In an advantageous embodiment, both of the discharge valves can be actuated in such a manner that they open synchronously with a standard operation. Identical cams thus also yield the same closing times. Ultimately, a conventional discharge time frame can thus be realised for the standard operation. In order to now accelerate the turbocharger, the opening time of the one discharge valve is shifted to earlier, while the other discharge valve remains unchanged. Overall, the discharge time frame is thereby increased to earlier while maintaining the same closing time. Exhaust gas that has a higher temperature and greater pressure can thus be used to accelerate the turbine.

It can be provided in an alternative embodiment to operate both of the discharge valves asynchronously during a standard operation, that is to say temporally staggered. A discharge time frame results herefrom that is greater than the opening time frame of the individual discharge valves. The discharge time frame starts with the opening time of the earlier-opening discharge valve and ends with the closing time of the later-closing discharge valve. It is particularly possible to use cams that realise opening time frames for the individual discharge-valve that are smaller than the conventional discharge time frame. By means of the discharge valve actuated in a temporally staggered manner, conventional discharge time frames can nevertheless still be represented. To accelerate the turbine, the opening time of the discharge valve opening earlier will now have to be switched to later, while the actuation of the other discharge valve is unchanged. The discharge time frame is hereby shortened, namely occurring at the same closing time but shifted toward later. This makes it possible in particular to shift the opening time frame into a range that lies after the lower dead-centre position of a stroke-adjustable piston in the respective cylinder in such a manner that a recompression stroke already occurs anew. With such an opening time, the exhaust gas already has an increased pressure as well as an increased temperature, which can be used to accelerate the turbine.

In principle, all cylinders of the piston engine can have two or more discharge valves that can be controlled separately by both shafts of the double overhead camshaft. An embodiment is likewise conceivable in which the number of the cylinders, the two or more discharge valves of which being separately controllable by both of the shafts of the double overhead camshaft, is less than the total number of the cylinders of the piston engine. The cylinders whose discharge valves work together only with one shaft of the double overhead camshaft in theory require, in particular, only one discharge valve.

Particularly advantageous is an embodiment in which the piston engine is additionally equipped with at least one fast-switching valve that is arranged in a fresh gas-conducting line of the piston engine upstream from the inlet valves associated with the cylinders. An individual fast-switching valve can be provided that is associated with all cylinders. An embodiment is likewise possible in which each cylinder is associated with a separate fast-switching valve. Such fast-switching valves, the switching times of which are less than 50 ms or less than 10 ms between opening and closing, can be used in different ways. For example, the duration of the inlet process can be limited by means of such fast-switching valves. In this manner and independently of a valve lift contour of an inlet camshaft, the duration for fresh gas or a fuel mixture to flow in can be adjusted according to operating-point specific load and rotational speed. By ending the inlet process early with the charge changing, the temperature of the combustion process in particular can be reduced, thereby reducing the formation of $NO_x$. In engines whose load control is realised by a cylinder charge control by means of a throttle valve, ending the inlet process early can be used for de-throttling, which has an advantageous effect on thermal efficiency.

Moreover, a pulse charging of the cylinder can be realised by means of such fast-switching valves. Gas-dynamic effects are used herefor. Vibrations, in particular, of the gas column in the fresh-gas path can be generated or selectively increased, resulting in increasing the filling of the cylinder with fresh charge or fresh gas.

Additional important features and advantages of the invention can be found in the dependent claims, in the drawings, and in the pertinent description of the figures with reference to the drawings.

It is understood that the features described above and those to be described in what follows can be used not only in the particular cited combination, but also in other combinations or independently without departing from the scope of the present invention.

BRIEF DESCRIPTION OF THE DRAWINGS

Preferred embodiments of the invention are shown in the drawings and are described in more detail in the following description, the same reference numerals referring to components which are the same or functionally the same or similar.

It is respectively shown schematically in

DETAILED DESCRIPTION

Figure 1:
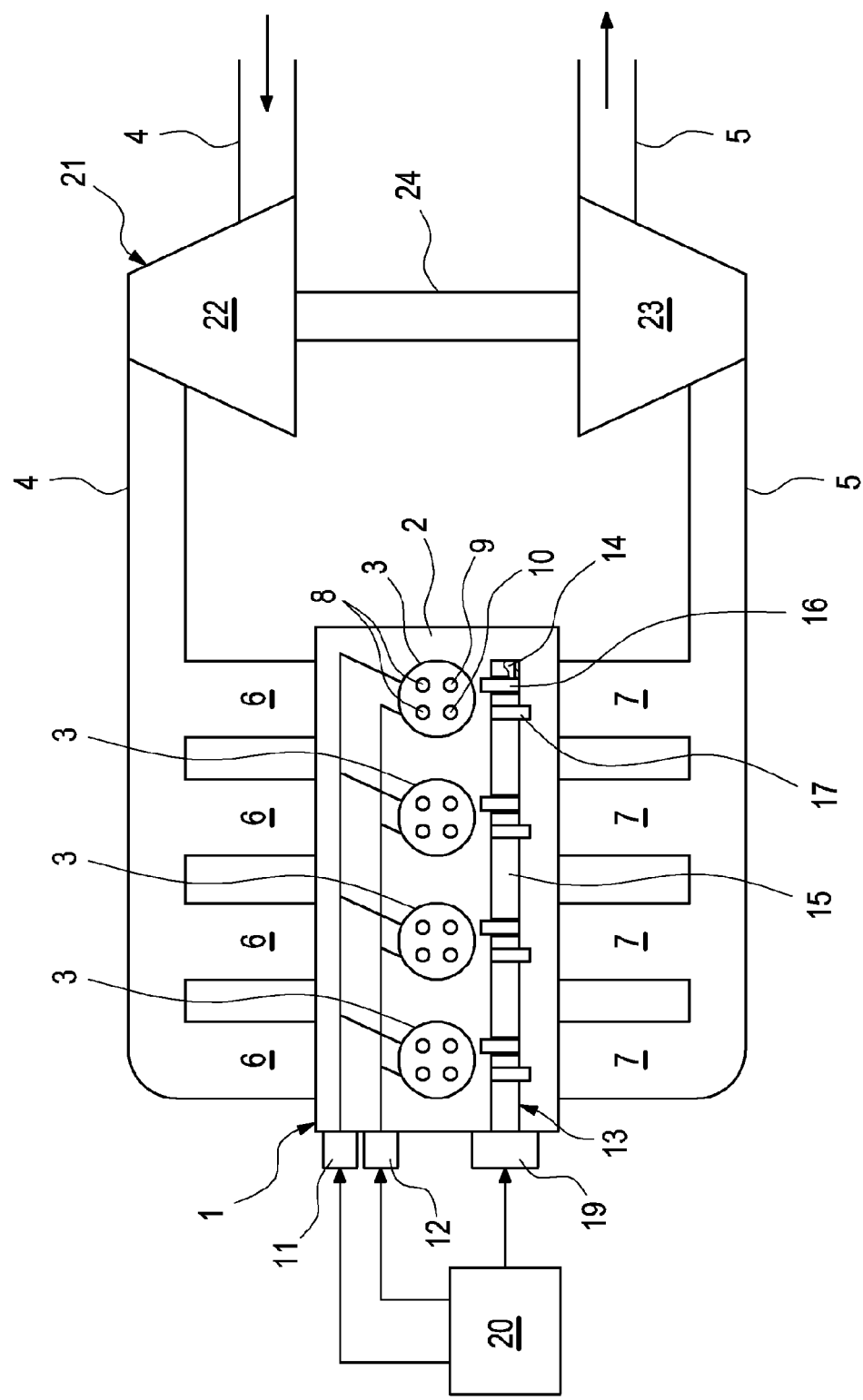
FIG. 1 a very simplified, connection diagram-like schematic diagram of an exhaust-gas turbocharged piston engine, FIG. 2 a simplified schematic diagram of a double overhead camshaft in the region of a cylinder, FIG. 3 a view as in FIG. 1; however, of a different embodiment, FIG. 4 a view as in FIG. 1; however, of yet a further embodiment, FIG. 5 a diagram in which an exemplary pressure curve with conventional control times in a cylinder and exemplary lift curves of two discharge valves of this cylinder are represented, FIG. 6 a diagram as in FIG. 5; however, of a different embodiment.

Corresponding to FIG. 1, a piston engine 1 according to the invention comprises at least one cylinder 3 in an engine block 2. In the example, four cylinders 3 are provided in series. It is evident that, in theory, a different number and/or arrangement of the cylinders 3 is also possible. The cylinders 3 of the piston engine 1 are supplied with fresh gas or with fresh mixture by a fresh-gas line 4. Exhaust gas is conducted away from the cylinders 3 by an exhaust-gas line 5. Individual inlet lines 6 go out from the fresh-gas 4 line to the individual cylinders 3, said inlet lines also being designatable as induction pipes. Individual discharge valves 7, which can also be designated as manifolds, connect the cylinders 3 to the exhaust-gas line 5.

For charge-changing processes, the cylinders 3 are provided with charge-changing valves. In the example, each cylinder 3 has two inlet valves 8 and two discharge valves, namely a first discharge valve 9 and a second discharge valve 10. Furthermore, an injection arrangement 11, which is depicted here only very simply, can work together with the cylinders 3. The injection arrangement 11 can be configured in such a manner that the fuel can be injected into the respective induction pipe 6 or directly into the cylinder 3 or can be injected by means of a combination of both. An ignition device 12, which is here depicted only very simply, can moreover be provided and associated with the cylinders 3 in a spark-ignition piston engine 1.

In order to actuate or to control the discharge valves 9, 10, the piston engine 1 has a double overhead camshaft 13. Corresponding to FIG. 2, said double overhead camshaft comprises an inner shaft 14 and an outer shaft 15 configured as a hollow shaft that is arranged coaxially to the inner shaft 14. Both of the shafts 14, 15 are arranged one within the other and are rotationally adjustable relative to one another. In the example shown, the inner shaft 14 carries a first cam 16 for each first discharge valve 9. The inner shaft 14 thus actuates by means of the first cams 16 the first discharge valves 9. In the example, the outer shaft 15 has a second cam 17 for each second discharge valve 10. All second discharge valves 10 are thus controlled by the outer shaft 15 by means of its second cams 17.

Figure 2:
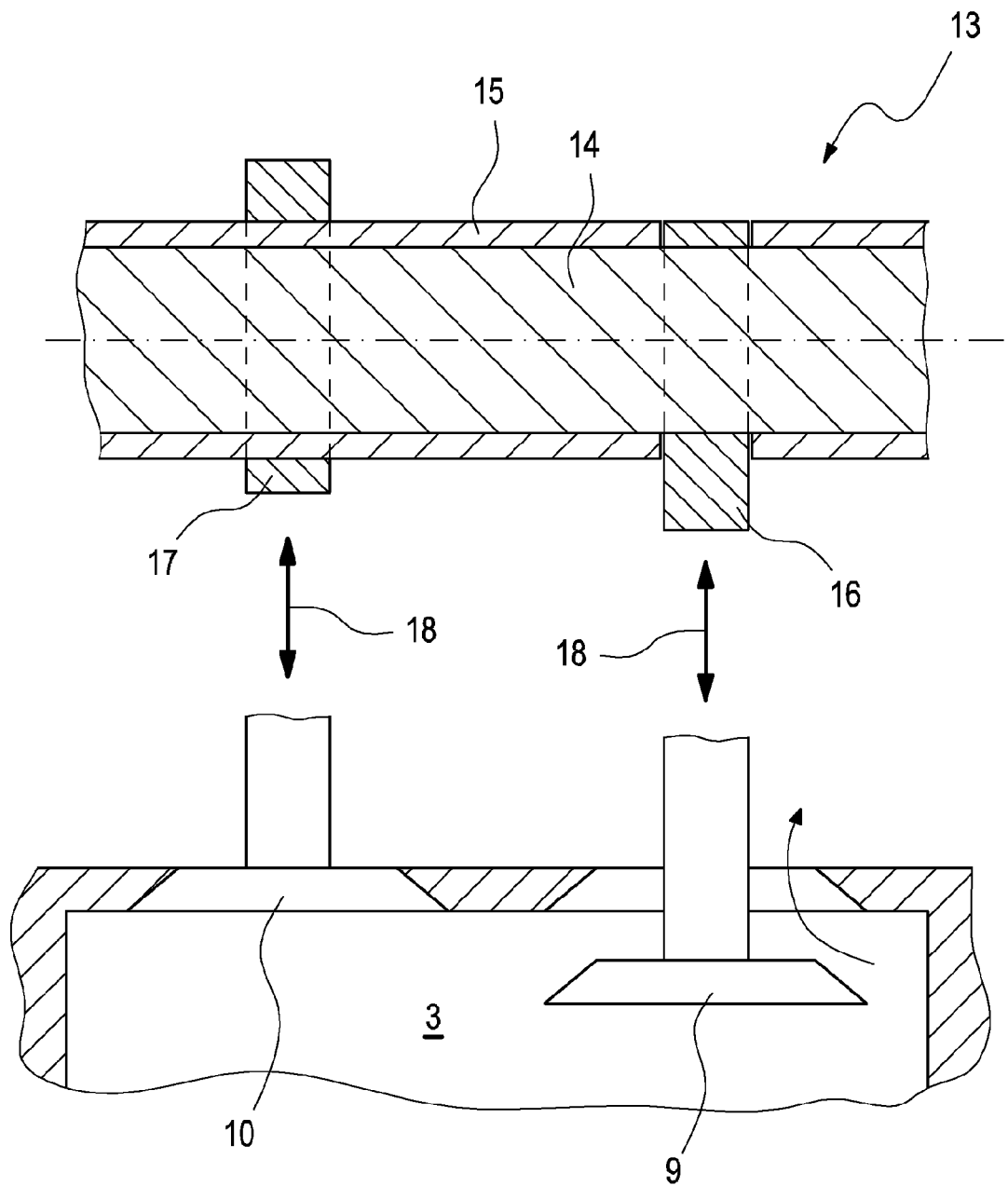

FIG. 2 shows in a simplified manner the interaction of the two shafts 14, 15 or of their cams 16, 17 with both of the discharge valves 9, 10 of one of the cylinders 3. The mechanical actuation path between the respective cams 16, 17 and the respective discharge valve 9, 10 is indicated here simply by double arrow 18. The relative position of both of the shafts 14, 15 is, for example, adjustable in such a manner that the first cams 16 and the second cams 17 synchronously drive both of the discharge valves 9, 10 to open and close. Changing the relative rotation position between both of the shafts 14, 15, which herein is characterised as relative position, can shift the opening time or the closing time of the first discharge valve 9 to earlier or later. The opening time or the closing time of the second discharge valve 10 can likewise be shifted to earlier or later. The opening time of the initially opening discharge valve 9, 10 forms the opening time of a discharge time frame. The closing time of the final closing discharge valve 9, 10 forms the closing time of the discharge time frame. By changing the rotation position between the shafts 14, 15, the length of the discharge time frame as well as of the entire position of the discharge time frame can be changed relative to the crankshaft angle of a crankshaft, which is not shown here, of the piston engine 1.

According to FIG. 1, in order to shift the inner shaft 14 relative to the outer shaft 15, an adjusting device 19 is provided that can be controlled by means of a control device 20. An adjusting of the inner shaft 14 and of the outer shaft 15 relative to the crankshaft can result with an adjusting device 19 integrated therein or also with a separate adjusting device.

The piston engine 1 is additionally equipped with an exhaust gas turbocharger 21 the compressor 22 of which is integrated in the fresh-gas line 4 and the turbine 23 of which is integrated in the exhaust-gas line 5. Compressors 22 and turbines 23 are conventionally drive-coupled to one another by a common shaft 24 and together form the rotor assembly of the exhaust gas turbocharger 21.

In order to now effect a rapid response of the turbocharger 21 given low rotational speeds or low charges of the piston engine 1, the control device 20 can control the adjusting device 19 in such a manner that it so changes the relative position between the shafts 14, 15, the opening time of the first discharge valve 9 or alternatively of the second discharge valve 10 of all cylinders 3 is shifted to earlier corresponding to a first alternative. That is to say, one of the two discharge valves 9, 10 opens earlier than in standard operation. Consequently, exhaust gas can escape from the respective cylinder 3 at a greater pressure and at a higher temperature compared to conventional control times. In particular, at this time the respective piston has not yet reached its lower dead-centre position, meaning that the energy content of the gas is still relatively high. Corresponding to a second alternative, the control device 20 can control the adjusting device 19 in such a manner that it so changes the relative position between the shafts 14, 15, the opening time of the first discharge valve 9 or alternatively of the second discharge valve 10 of all cylinders 3 is shifted to later, in order to effect a rapid response of the turbocharger 21 at low rotational speeds or at low charges of the piston engine 1. In other words, one of the two discharge valves 9, 10 opens later than in standard operation. Consequently, exhaust gas can escape from the respective cylinder 3 at a greater pressure and at a higher temperature compared to conventional control times. In particular, at this time the respective piston has already gone beyond its lower dead-centre position, meaning that the subsequent recompression of the energy content of the gas is already relatively high anew. Accordingly, the exhaust gas in both alternatives has a considerably higher enthalpy that can be converted into kinetic energy at the turbine 23. The turbine 23 can accordingly accelerate comparably rapidly, leading to the concomitantly shortened starting of the turbocharger 21.

In the exemplary embodiments shown here, all cylinders 3 of the piston engine 1 are equipped with two discharge valves 9, 10 that are respectively separately controllable by both of the shafts 14, 15 of the double overhead camshaft 13. Alternatively, an embodiment is, however, also conceivable in which the number of the cylinders 3, which have two discharge valves 9, 10 that are separately controllable by both of the shafts 14, 15 of the double overhead camshaft 13, is less than the total number of cylinders 3 of the piston engine 1. The other cylinders 3 can then respectively have only one or a plurality of discharge valves that are all, however, controllable by only the inner shaft 14 or alternatively by only the outer shaft 15. In order to accelerate the exhaust-gas turbocharger 21 in such an embodiment, the exhaust gas is not withdrawn from all cylinders 3 earlier but rather from only one cylinder 3 or only two cylinders 3, for example, yet nevertheless from a reduced number of cylinders with regard to the total number of cylinders 3. In such an embodiment, the work transmittable to the crankshaft of the piston engine 1 by the earlier or later opening of the respective discharge valve 9, 10 is not so markedly reduced as in the previously-described embodiment in which the exhaust gas is temporarily withdrawn from all cylinders 3 at an increased cylinder pressure.

Figure 3:
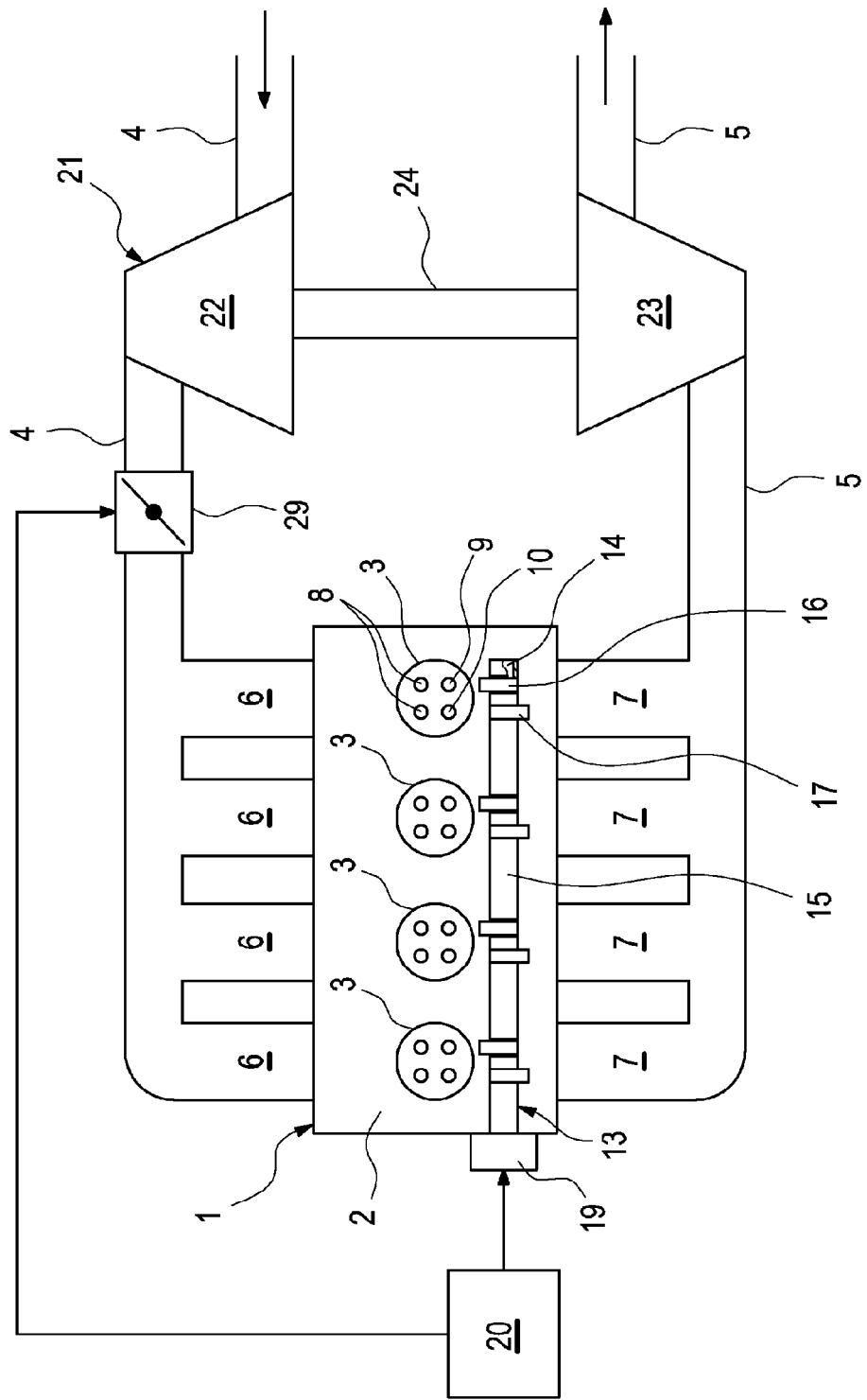
Figure 4:
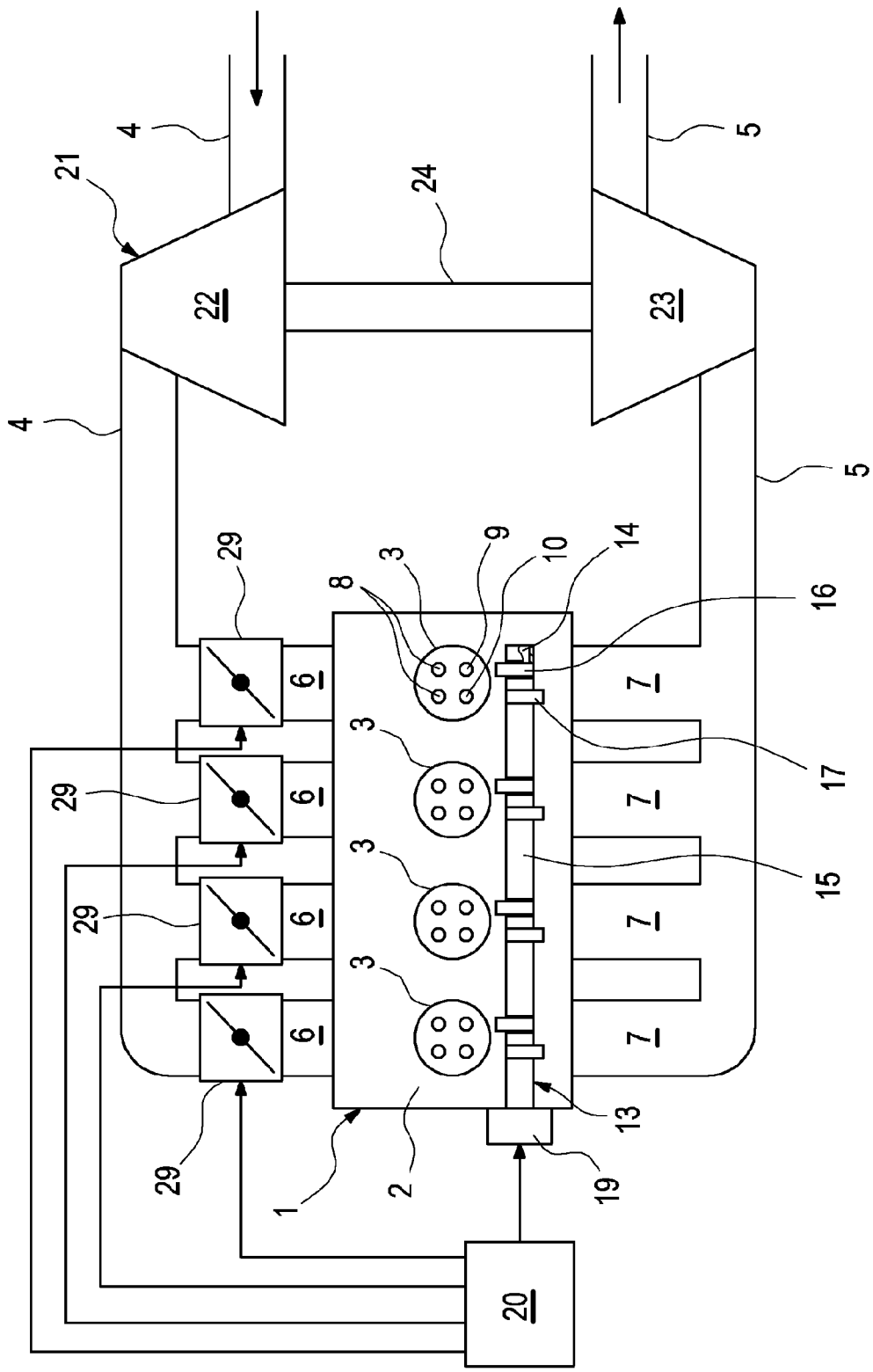

FIGS. 3 and 4 show additionally embodiments of the piston engine 1 shown in FIG. 1, the injection arrangement 11 and the ignition device 12 however having been omitted to simplify the representation. Corresponding to FIGS. 3 and 4, the piston engine 1 can have at least one fast-switching valve 29. This is arranged upstream from the inlet valve 8 in a line of the piston engine 1 that conducts fresh gas. A fast-switching valve 29 is to be understood in the present context as a valve 29 that achieves particularly similar switching times upon switching between a closed state and an open state or from an open state to a closed state, as is the case with the gas-exchange valves 8, 9, 10. Owing to their arrangement in the fresh-gas tract, which is also characterised in the following as fresh-gas valve 29, such fast-switching valves 29 in particular can achieve switching times that are less than 10 ms. The fresh-gas valves 29 can work with a flap, which here is suggested symbolically, and be discontinuously switchable between a closed position and an open position. Continuously working fresh-gas valves 29 are likewise conceivable in which the flap or a rotary slide valve or any other valve member whatsoever rotates with an unchanging direction of rotation, thereby likewise making corresponding switching times possible. Discontinuously working, fast-switching valves 29 can also be characterised as air pulse valves.

In the embodiment shown in FIG. 3, all cylinders 3 are associated with a common fresh-gas valve 29. In contrast thereto, in the embodiment shown in FIG. 4, each cylinder 3 is associated with a separate fresh-gas valve 29. For this, the individual fresh-gas valves 29 are arranged in the induction pipes 6. The fresh-gas valves 29 can be actuated by a corresponding control device. In the present case, this control device is integrated in the control device 20 that is already present. In theory, a separate control device for actuating the fresh-gas valve 29 can also be present. The respective control device 20 can now be configured in such a manner that it actuates the respective fresh-gas valve 29 as a function of a current operational state of the piston engine 1. To this end, the control device 20 can be coupled to a conventional engine control unit that is not shown here. In principle, it is also possible to integrate in a hardware-like manner the shown control device 20 into said engine control unit and/or to implement it in said engine control unit in a software-like manner.

The control device 20 can control the respective fresh gas valve 29 in order to, for example, realise a pulse charging of the cylinders 3. By using gas-dynamic effects, it is possible to generate, by means of the one fresh-gas valve 29 or by means of the fresh-gas valves 29, a pulse-like fresh-gas flow in the form of a compression wave that can be introduced into the respective cylinder 3 upon a charge-cycle process. In this manner, the fresh-charge mass brought into the cylinders 3 can be increased. Such a pulse charging can be used particularly advantageously if the turbocharger 21 is, owing to low rotational speeds and engine loads, essentially inactive or does not enable significant pressure increases in the fresh gas. Furthermore, a cold charging can, by means of the fresh gas valves 29, be realised according to the so-called Miller Process, which leads to pollutant emission improvements. Additionally, it is likewise possible to generate hot charging by means of the fresh-gas valves 29 though a late opening of the fresh-gas valves 29. An accelerated heating of the piston engine 1 upon a cold start is realised, which is likewise advantageous in terms of pollutant emissions, fuel consumption, and service life.

Furthermore, a de-throttling of the fresh-gas system or of the piston engine 1 can be realised in the partial load by means of the at least one fresh-gas valve 29. The fresh-gas valve 29 itself is not a throttle. With a throttle, the cross section that can be flowed through can be virtually continuously varied in the fresh-gas line or throttled. By means of the fresh-gas valve 29, a de-throttled load control by means of filling variation can be realised without the use of a throttle. The fresh gas can reach the cylinders 3 unthrottled, that is to say without the use of a throttle flap or the like, which ultimately improves the performance of the piston engine 1. By means of the fresh-gas valves 29 arranged in the induction pipes 6, the fresh gas flow can simply be switched off as soon as the desired filling is reached in the respective cylinder 3.

Accordingly, in one preferred embodiment of the piston engine 1, the fresh-gas line 4 or the complete fresh-gas assembly can be unthrottled or de-throttled, that is to say without having a special throttle element serving to throttle.

In order to be able to accelerate the starting of the exhaust-gas turbocharger 21 to an earlier opening of the respective discharge valve 9, 10, the control device 20 or a suitable different control device cooperate with the injection arrangement 11 in such a manner that for this instance, the injection time and/or, in spark-ignited engines, also the ignition timing is shifted in the respective cylinder 3 in such a suitable manner that, owing to a late location of the combustion position of centre of gravity, a higher exhaust-gas enthalpy results in comparison with a conventional position of centre of gravity. Additionally or alternatively, the control 20 or any other suitable control mechanism whatsoever can cooperate with the ignition device 12 in such a manner that in order to accelerate the exhaust-gas turbocharger 21, the ignition time is shifted in a suitable manner.

Figure 5:
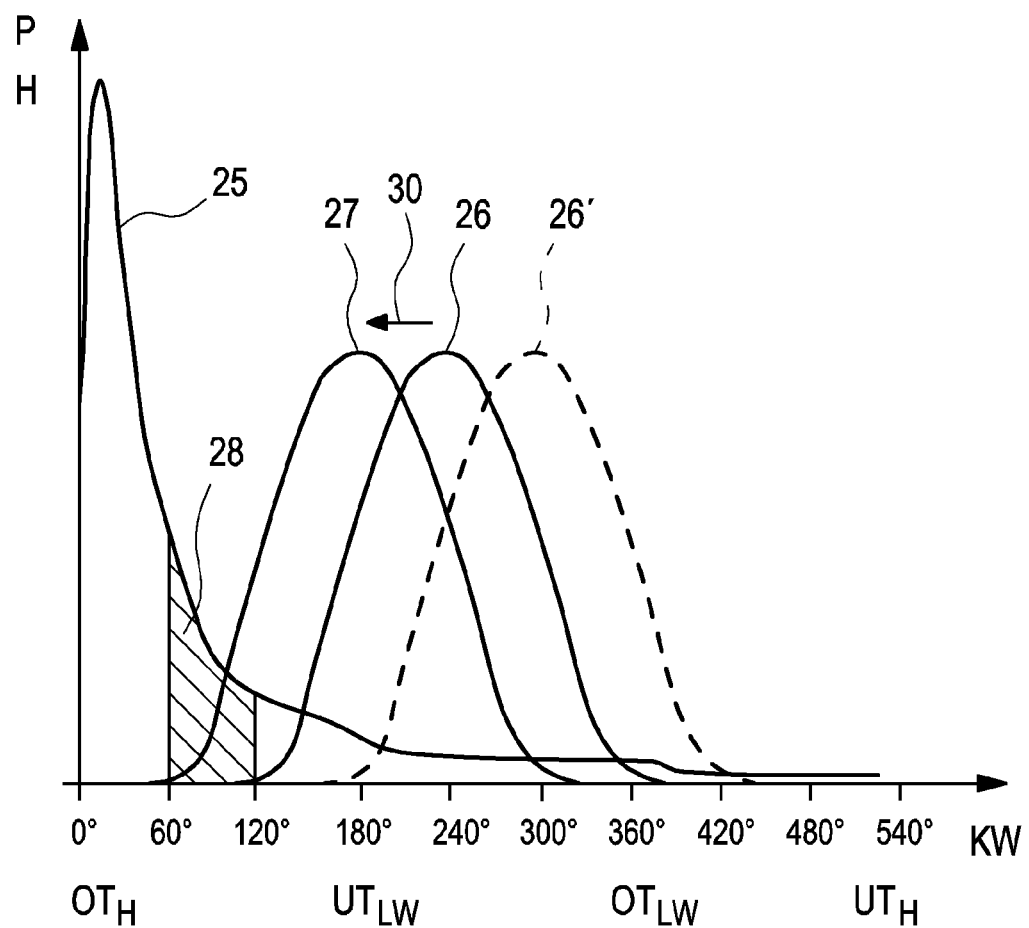

In reference to FIG. 5, the operating method of the piston engine 1 is intended to be explained corresponding to the first alternative in the following in greater detail. FIG. 5 shows a diagram in which ordinates are assigned a pressure P in a cylinder 3 as well as a stroke H of the both of the discharge valves 9, 10 of this cylinder 3, and in which the abscissa represent the corresponding crankshaft angle KW. The diagram contains an exemplary course 25 of the pressure P in the cylinder 3 as a function of the crankshaft angle KW, as would result in conventional discharge-valve control times. Furthermore, the diagram contains a progression 26 of the stroke H of the first discharge valve 9 as well as a progression 27 of the stroke H of the second discharge valve 10. Both of the lift curves 26, 27 are also assigned as a function of the crankshaft angle KW.

***During standard operation with low load, both of the discharge valves 9, 10 are controlled simultaneously. The corresponding cams 16, 17 are provided therefor with identical control contours in order to maintain the identical curves 26, 27. Both of the curves 26, 27 are congruent upon synchronous actuation and thus correspond to the exemplary curve 26 of the first discharge valve 9 in FIG. 5. This means that both of the discharge valves 9, 10, given a crankshaft angle of approximately 120° in reference to the upper dead-centre position $OT_H$ positioned here at 0° KW, start with their opening motion so that they are already largely open at the lower dead-centre position $UT_{LW}$ of the associated piston that corresponds to 180° KW relative to $OT_H$. The discharge valves 9, 10 have achieved their maximum opening then at 240° KW relative to $OT_H$. Both discharge valves 9, 10 are closed again at approximately 360° KW relative to $OT_H$ that occurs together with the upper dead-centre position $OT_{LW}$ of the piston or also somewhat later or earlier. The discharge elevation curve 26 shown already contains an early opening of a discharge valve that need not be mandatory. Conventional discharge control times begin with the opening at a later time. The diagram according to FIG. 5 additionally shows with a broken line a curve 26' that corresponds to a discharge elevation curve resulting with conventional discharge control times.

If the turbocharger 21 is to be started in as short a time as possible from this standard operational state in such a manner as to be characterised by a short reaction time, the relative position between the inner shaft 14 and the outer shaft 15 is changed in such a manner by a corresponding actuation of the double overhead camshaft 13 that the second discharge valve 10 is switched to open at an earlier time. In the example shown in FIG. 5, this is recognisable in that the lift curve 27, corresponding to the arrow 30, associated with the second discharge valve 10 is shifted by, for example, 60° KW in the direction of the smaller crankshaft angle KW. This means that the second discharge valve 10 already begins with its opening movement at 60° KW with regard to $OT_H$. The relative position of the lift curve 26 associated with the first discharge valve 9 remains unchanged with respect to the crankshaft angle KW. Since the closing time of the entire developing discharge time frame remains at approximately 360° KW therewith, the entire discharge time frame is enlarged by 60° earlier in the example. While the discharge time frame in the previously-described standard operation ranges from 120° KW to 360° KW, thus comprising 240° KW, it is now increased by 60° KW earlier, now spanning from 60° KW with regard to $OT_H$ to 360° KW with regard to $OT_H$, thereby comprising 300° KW altogether. A hatched region 28 within the pressure curve 25 is furthermore marked in FIG. 5. This region 28 symbolises in an exemplary manner with respect to a second discharge valve 10 that has not been temporally advanced, the exhaust gas enthalpy that is additionally made ready, arrives in the exhaust-gas line 5 along with the exhaust-gas flow owing to the second discharge valve having opened earlier, and is useful for accelerating the turbine 23.

In order to accelerate the turbine 23, the control device 20 can, according to a preferred embodiment, place the opening time of the one discharge valve 9, 10, it being of the second discharge valve 10 in the example, in a range that is necessarily between 30% to 90% of an expansion stroke of the associated piston. In the example shown, the opening time is shifted from ⅔ to ⅓ of the expansion stroke.

Figure 6:
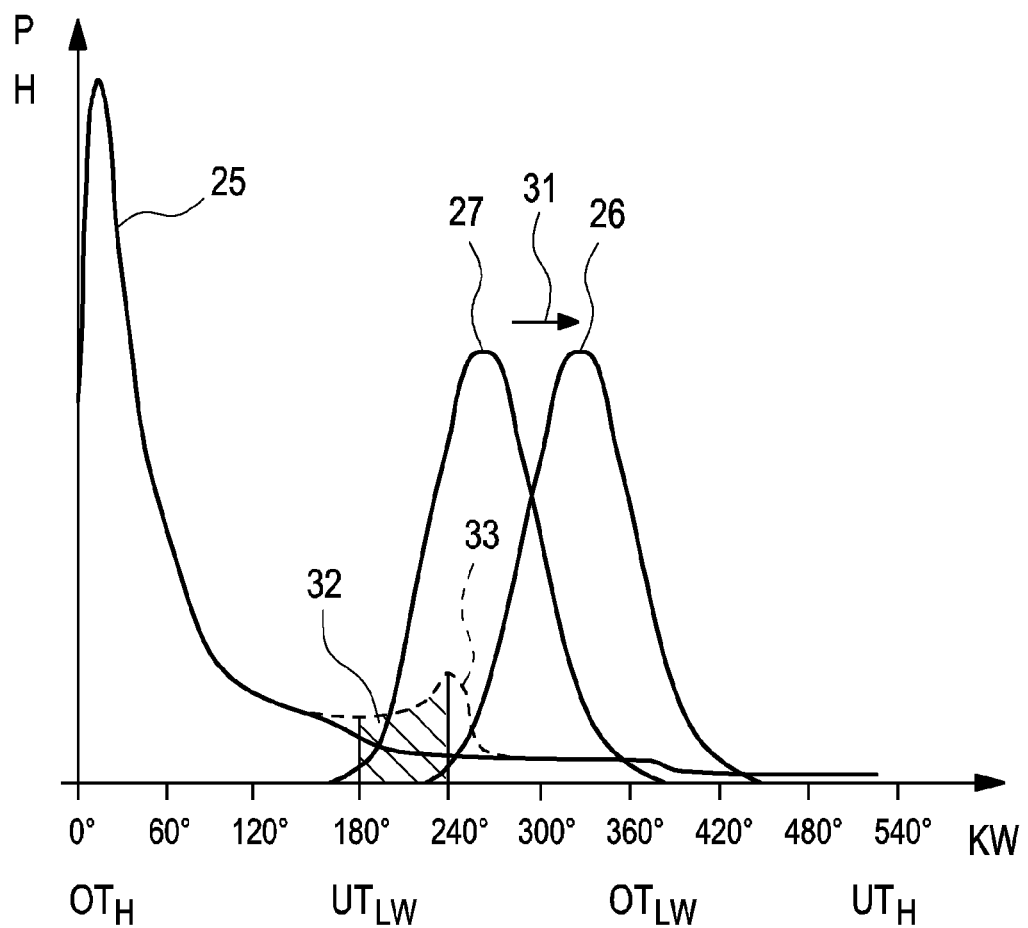

With reference to FIG. 6, the functioning of the piston engine 1 is intended to be described in greater detail in the following, corresponding to the second alternative. FIG. 6 shows another diagram in which ordinates are assigned a pressure P in a cylinder 3 as well as a stroke H of both of the discharge valves 9, 10 of this cylinder 3, and in which the abscissa represent the corresponding crankshaft angle KW. The diagram contains an exemplary curve 25 of the pressure P in the cylinder 3 as a function of the crankshaft angle KW, as would result in conventional discharge-valve control times. Furthermore, the diagram contains a curve 26 of the stroke H of the first discharge valve 9 as well as a curve 27 of the stroke H of the second discharge valve 10. Both of the lift curves 26, 27 are also assigned as a function of the crankshaft angle KW.

During standard operation with low load, both of the discharge valves 9, 10 are controlled asynchronously. In this example as well, both of the curves 26, 27 are shaped identically, which is realisable with cams 16, 17 having identical control contours. As is also the case with the first alternative, this is need not necessarily be so. During standard operation, in the example, the curve 27 of the second discharge valve 10 is positioned temporally before the curve 26 of the first discharge valve 9. That means that in standard operation, the second discharge valve 10 opens prior to the first discharge valve 9. The first discharge valve 9 therefore closes after the second discharge valve 10. While in the embodiment shown in FIG. 5 the control contours of the cams 16, 17 are formed in such a manner that the curves 26, 27 of the discharge valve 9, 10 respectively have an opening time frame of approximately 240° KW, the curves 26, 27 represented in FIG. 6 show special embodiments that make smaller opening time frames possible. In the examples shown, the control contours of the cams 16, 17 are shaped in such a manner that the opening time frames of both of the discharge valves 9, 10 are approximately only 180° respectively. In theory, other opening time frames that are smaller than 240° KW are also conceivable. In particular, opening time frames of less than 180° KW are also conceivable.

It is added purely by way of example that, in the example shown, the second discharge valve 10, corresponding to its curve 27 at a crankshaft angle of approximately 180° in reference to the upper dead-centre position $OT_H$ positioned here at 0° KW, begins its opening motion, that is to say in the region of a lower dead-centre position $UT_{LW}$ of the associated piston. The second discharge valve 10 achieves its maximum opening at approximately 270° KW relative to $OT_H$. The second discharge valve 10 closes at approximately 360° KW relative to $OT_H$. The curve 27, which can also be characterised as discharge elevation curve 27, thus already has an opening time frame of approximately 180° KW.

The curve 26 of the first discharge valve 9, which can also be characterised as discharge elevation curve 26, is adjusted to be approximately 60° KW later with respect to the discharge elevation curve 27 of the second discharge valve in the example. Accordingly, the first discharge valve 9 opens in standard operation at approximately 240° KW, reaches its maximum opening at approximately 330° KW, and closes at approximately 420° KW. The second discharge elevation curve 26 thus has an opening time frame of approximately 180° KW. Owing to the overlapping opening time frames, a total discharge time frame of approximately 240° KW is defined for the respective cylinders. It begins with the opening time of the second discharge valve 10 that opens earlier, that is to say at around 180° KW, and ends at the closing time of the first discharge valve 9 that closes later, which is to say at approximately 420° KW. In comparison to the alternative shown in FIG. 5, the opening time frame in standard operation is approximately of the same magnitude for both alternatives. The positioning of the discharge time frame or of both of the curves 26, 27 of the second alternative corresponds to the curve 26', represented by a broken line, of a conventional discharge valve.

If the turbocharger 21 is to be started in as short a time as possible from this standard operational state in such a manner as to be characterised by a short reaction time, the relative position between the inner shaft 14 and the outer shaft 15 is changed in such a manner by a corresponding actuation of the double overhead camshaft 13 that the second discharge valve 10 is switched to later with regard to its opening time. In the example shown in FIG. 6, this is recognisable in that the lift curve 27, corresponding to the arrow 31, associated with the second discharge valve 10 is shifted by, for example, 60° KW in the direction of the larger crankshaft angle KW. This means that the second discharge valve 10 then begins with its opening movement only initially at 240° KW with regard to $OT_H$. The relative position of the lift curve 26 associated with the first discharge valve 9 remains unchanged with respect to the crankshaft angle KW. Since the closing time of the entire developing discharge time frame remains at approximately 420° KW therewith, the entire discharge time frame in the example is decreased to later by approximately 60° KW. While the discharge time frame in the previously-described standard operation ranges from approximately 180° KW to approximately 420° KW, thus comprising approximately 240° KW, it is now decreased by 60° KW to later and now spans from approximately 240° KW to approximately 420° KW, comprising only 180° KW altogether. During this acceleration operation, both of the curves 26, 27 are congruent and correspond to the exemplary curve 26 of the first discharge valve represented in FIG. 6. Both of the discharge valves 9, 10 open and close corresponding to the discharge elevation curve 26 associated with the first discharge valve.

A hatched region 32 within the pressure curve 25 and within a modified pressure curve 33 is furthermore marked in FIG. 6. The modified pressure curve 33 results from the circumstance in which the opening time of the discharge time frame in the example shown occurs temporally after the lower dead-centre position $UT_{LW}$, the respective piston already moving in its compression direction again. According thereto, during this recompression phase, the pressure in the respective cylinder is increasing anew, as is the temperature in the exhaust gas. The hatched region symbolises in an exemplary manner with respect to a second discharge valve 10 that has not been temporally delayed, the exhaust gas enthalpy that is additionally made ready, arrives in the exhaust-gas line 5 along with the exhaust-gas flow owing to the second discharge valve 10 having opened later, and is useful for accelerating the turbine 23.

According to a preferred embodiment, in order to accelerate the turbine 23, the control device 20 can place the opening time of the one discharge valve 9, 10, which is of the second discharge valve 10 in the example, in a range that is necessarily between 0% and 30% of a recompression stroke of the associated piston. In the example shown, the opening time of $UT_{LW}$ is shifted to approximately one-third of the recompression stroke. As shown, the discharge elevation curve 26 of the first discharge valve 9 is already in this range in the example, that is to say that the first discharge valve 9, also in standard operation, opens later with respect to $UT_{LW}$, which is to say in the recompression phase.

The invention claimed is:

1. A piston engine, comprising:
   at least one cylinder in communication with a fresh-gas line that is at least one of unthrottled and dethrottled, the at least one cylinder having at least a first discharge valve and a second discharge valve; and
   a double overhead camshaft for controlling the first and a second discharge valves,
      wherein the double overhead camshaft includes an inner shaft, which has at least one first cam for controlling the first discharge valve, and an outer shaft that is coaxial to said first inner shaft and has at least one second cam for controlling the second discharge valve, wherein all cylinders of the piston engine have the first and second discharge valves that are separately controllable by the shafts of the double overhead camshaft, and
      wherein the inner shaft and the outer shaft are rotationally adjustable relative to one another to change the discharge timing of the first and second discharge valves.

2. The piston engine as specified in claim 1, wherein the opening time of both of the first and second discharge valves are at least one of smaller than a 240° crankshaft angle, smaller than a 200° crankshaft angle and smaller than a 180° crankshaft angle.

3. The piston engine as specified in claim 1, further comprising:
   an injection arrangement for injecting fuel into the cylinder; and
   a control device for controlling the injection arrangement, the control device shifts the injection time to accelerate a turbine.

4. The piston engine as specified in claim 3, wherein control device in a spark-ignited engine shifts to retard the combustion position of centre of gravity through multiple injections to increase the exhaust-gas enthalpy in comparison with a conventional position of centre of gravity to accelerate the turbine.

5. The piston engine as specified in claim 1, further comprising:
   an ignition device for igniting a fuel-fresh gas mixture in the respective cylinder; and
   a control device is provided for controlling the ignition device, the control device shifts the ignition time to accelerate a turbine.

6. A piston engine, comprising:
   at least one cylinder that has at least a first discharge valve and a second discharge valve;
   a double overhead camshaft for controlling the first and a second discharge valves,
      wherein the double overhead camshaft includes an inner shaft, which has at least one first cam for controlling the first discharge valve, and an outer shaft that is coaxial to said first inner shaft and has at least one second cam for controlling the second discharge valve, and
      wherein the inner shaft and the outer shaft are rotationally adjustable relative to one another to change the discharge timing of the first and second discharge valves; an exhaust gas turbocharger having a turbine arranged in an exhaust-gas line of the piston engine; and
   a control device, wherein
      the control device controls an adjusting device for rotational adjustment of a relative rotational position between the inner and outer shafts, and
      the control device shifts to at least one of advance and retard the opening time of at least one of the first discharge valve and the second discharge valve to accelerate the turbine.

7. The piston engine as specified in claim 6, wherein the control device adjusts the opening time of the first and second discharge valves in a range approximately between 30% to 90% of an expansion stroke of a stroke-adjustable piston in the at least one cylinder to accelerate the turbine.

8. The piston engine as specified in claim 7, wherein the control device synchronously actuates the first and second discharge valves to an open position.

9. The piston engine as specified in claim 8, wherein the opening time of both of the first and second discharge valves are at least one of smaller than a 240° crankshaft angle, smaller than a 200° crankshaft angle and smaller than a 180° crankshaft angle.

10. The piston engine as specified in claim 7, wherein the opening time of both of the first and second discharge valves are at least one of smaller than a 240° crankshaft angle, smaller than a 200° crankshaft angle and smaller than a 180° crankshaft angle.

11. The piston engine as specified in claim 6, wherein the control device actuates at least one of the first and second discharge valves to an open position earlier than the unopened first or second discharge valve, the opening time of which is in a recompression stroke of a stroke-adjustable piston in the at least one cylinder.

12. The piston engine as specified in claim 11, wherein the control device shifts the opening time of the first and second discharge valves, such that both of the first and second discharge valves open synchronously.

13. The piston engine as specified in claim 12, wherein the opening time of both of the first and second discharge valves are at least one of smaller than a 240° crankshaft angle, smaller than a 200° crankshaft angle and smaller than a 180° crankshaft angle.

14. The piston engine as specified in claim 11, wherein the opening time of both of the first and second discharge valves are at least one of smaller than a 240° crankshaft angle, smaller than a 200° crankshaft angle and smaller than a 180° crankshaft angle.

15. The piston engine as specified in claim 6, wherein the number of cylinders, both discharge valves of which cylinders being separately controllable by the inner and outer shafts of the double overhead camshaft, is less than the total number of cylinders of the piston engine.

16. The piston engine as specified in claim 6, wherein the opening time of both of the first and second discharge valves are at least one of smaller than a 240° crankshaft angle, smaller than a 200° crankshaft angle and smaller than a 180° crankshaft angle.

17. A piston engine, comprising:
   at least one cylinder that has at least a first discharge valve and a second discharge valve;
   a double overhead camshaft for controlling the first and second discharge valve,
      wherein the double overhead camshaft includes an inner shaft, which has at least one first cam for controlling the first discharge valve, and an outer shaft that is coaxial to said first inner shaft and has at least one second cam for controlling the second discharge valve, and
      wherein the inner shaft and the outer shaft are rotationally adjustable relative to one another to change the discharge timing of the first and second discharge valves;
   at least one fast-switching valve that is arranged upstream from the first and second discharge valves and in a line, which conducts fresh gas, of the piston engine;
   a control device configured for controlling the at least one fast-switching valve; and
   said at least one cylinder includes at least one of a separate fast-switching valve and a common fast-switching valve.

18. The piston engine as specified in claim 17, wherein the control device of the fast-switching valve is controlled as a function of a current operational state of the piston engine to realize at least one of a pulse charging, a dethrottling, a cold charging and a hot charging.

19. The piston engine as specified in claim 17, wherein a fresh-gas line supplying the cylinders is at least one of unthrottled and dethrottled.

20. A piston engine, comprising:
   a plurality of cylinders, each of the plurality of said cylinders having at least a first discharge valve and a second discharge valve;
   a double overhead camshaft for controlling the first and a second discharge valves, the double overhead camshaft including:
      an inner shaft having at least one cam for controlling the first discharge valve;
      an outer shaft arranged coaxial to the inner shaft, the outer shaft having at least one second cam for controlling the second discharge valve;
      wherein said each of the plurality of said cylinders include said at least the first discharge valve and the second discharge valve separately controllable by the respective inner and outer shaft of the double overhead camshaft, the inner shaft and the outer shaft being rotationally adjustable relative to one another to change a discharge timing of the first and second discharge valves;
an injection arrangement for injecting fuel into said each of the plurality of said cylinders; and
a control device for controlling the injection arrangement, wherein the control device shifts an injection time of the fuel to accelerate a turbine.

21. The piston engine as specified in claim 20, wherein the control device is configured to shift the injection time to retard the combustion position of centre of gravity via multiple injections to increase the exhaust-gas enthalpy in comparison with a convention position of centre of gravity.

22. A piston engine, comprising
a plurality of cylinders, each of the plurality of said cylinders having at least a first discharge valve and a second discharge valve;
a double overhead camshaft for controlling the first and a second discharge valves, the double overhead camshaft including:
an inner shaft having at least one cam for controlling the first discharge valve;
an outer shaft arranged coaxial to the inner shaft, the outer shaft having at least one second cam for controlling the second discharge valve;
wherein said each of the plurality of said cylinders include said at least the first discharge valve and the second discharge valve separately controllable by the respective inner and outer shaft of the double overhead camshaft, the inner shaft and the outer shaft being rotationally adjustable relative to one another to change a discharge timing of the first and second discharge valves;
an ignition device for igniting a fuel-gas mixture associated with said each of the plurality of said cylinders; and
a control device for controlling the ignition device,
wherein the control device shifts an ignition time of the fuel-gas mixture to accelerate a turbine.

\* \* \* \* \*